United States Patent [19]

Williams

[11] 4,362,756

[45] Dec. 7, 1982

[54] BROWN SUGAR SWEETENED CONDENSED MILK AND PROCESS FOR PREPARATION THEREOF

[75] Inventor: Alexander W. Williams, Syracuse, N.Y.

[73] Assignee: Borden, Inc., Columbus, Ohio

[21] Appl. No.: 335,226

[22] Filed: Dec. 28, 1981

[51] Int. Cl.³ .............................................. A23C 9/00
[52] U.S. Cl. .................................... 426/587; 426/658
[58] Field of Search ............... 426/587, 654, 658, 491, 426/580

[56] References Cited

U.S. PATENT DOCUMENTS

| | | | |
|---|---|---|---|
| 329,778 | 11/1885 | Sabin | 426/587 |
| 2,565,085 | 8/1951 | Peebles | 426/587 |
| 2,570,231 | 10/1951 | Hansen | 426/587 |
| 3,108,875 | 10/1963 | Bell | 426/587 |
| 4,129,664 | 12/1978 | Kruseman et al. | 426/587 |

OTHER PUBLICATIONS

Kirk–Othmer, *Sweetened Condensed Milk*, vol. 13, 1967, pp. 553–556.

*Primary Examiner*—Arthur L. Corbin
*Attorney, Agent, or Firm*—Kenneth P. Van Wyck; George P. Maskas

[57] ABSTRACT

A brown sugar sweetened condensed milk composition of at least 8.0% milk fat and 28% total milk solids, water, a nutritive carbohydrate sweetener, comprising high ash, unrefined brown sugar solids syrup and sucrose, and sufficient alkaline stabilizer to adjust the pH of the sweetened milk pH to 6.75–6.85 prior to heating the sweetened milk to temperatures above about 180° F. thereby avoiding casein precipitation in a conventional process for preparing sweetened condensed milk.

5 Claims, No Drawings

BROWN SUGAR SWEETENED CONDENSED MILK AND PROCESS FOR PREPARATION THEREOF

BACKGROUND OF THE INVENTION

This invention relates to an unrefined, high ash content brown sugar sweetened condensed milk and method for preparation thereof.

Sweetened condensed milk is a federally standardized food product, obtained by partial removal of water from a mixture of milk and a safe, nutritive carbohydrate sweetener, which has long been used in the bakery and confectionery trades. Sweetened condensed milk has a prescribed milk fat content of not less than 8.0% and sufficient nutritive sweetener, e.g., sucrose, to give a solution having an osmotic pressure sufficiently high enough to prevent the growth of microorganisms which would cause product spoilage. As a low acid food, i.e., pH greater than 4.6, the sweetener must be sufficient to give a water activity of not more than 0.85. Thus when sucrose is used as the sweetener, a minimum sugar-in-water concentration of 61.5% is necessary for the required water activity. Other sweeteners such as the monosaccharide dextrose, which have a higher osmotic pressure than sucrose, can be used in lesser concentration.

The basic processing techniques for production of sweetened condensed milk are shown for example, in the description of sweetened condensed milk technology in the 1967 Kirk-Othmer, *Encyclopedia of Chemical Technology*, Vol. 13 at pages 553-556. Briefly, the sweetener, e.g., in a syrup form, can be added to raw milk in storage or to warmed milk in a hot well. The sweetened milk is subjected to forewarming at sufficient temperature and time to destroy all enzymes, and most microorganisms and to control age thickening in the finished product. The forewarmed milk is concentrated to the desired total solids level, cooled, seeded with lactose and then delivered to agitated storage for subsequent packaging.

Sweetened condensed milk for retail distribution utilizes refined sucrose as the sweetener for ease of color, flavor, and viscosity control. This retail sweetened condensed milk has been used principally in dessert and confections, many of which also provide for the addition of brown sugar. A brown sugar sweetened condensed milk, as provided for in the instant invention is, therefore, beneficial in accentuating the brown sugar flavor of these recipes or providing unique flavorings to other dessert recipes.

Prior art processes for producing sweetened condensed milk have long recognized that the conventional sucrose sweetener can be replaced with other dissaccharides such as the lactose used in U.S. Pat. No. 329,778 to Sabin, or at least partially replaced by dextrose as shown, for example, in U.S. Pat. No. 2,570,231 to Hansen for sweetened condensed skim milk. The prior art has also taught, however, that only about 25% of the sucrose can be replaced with dextrose without encountering accelerated age thickening or browning. Similar limitations have been found on the use of other prepared nutritive carbohydrate sweeteners for condensed milk such as corn syrup, hydrolyzed corn syrup, honey and the like. Thus, though the legal definition of sweetened condensed milk broadly allows for nutritive sweeteners, i.e. glucose, fructose, maltose, etc., refined sucrose has continued to be used as the sweetener in sweetened condensed milk and other related high sugar solid products like the sweetened condensed cream in U.S. Pat. No. 3,108,875 to Bell, and vegetable based sweetened condensed milk-like products, as in U.S. Pat. No. 4,129,664 to Kruseman, et al.

Condensed milk products have been known to be subject to problems of heat instability or coagulation and age thickening due to the effects of increased acidity and levels of polyvalent cations in the mineral content of the milks. Thus, the usual practice to prevent heat destabilization due to slight variation in milk acidity and mineral content has been the addition of stabilizing salts such as disodium phosphate. Stabilizing with calcium acid lactate has also been suggested in U.S. Pat. No. 2,570,231. The addition of refined sucrose to milk in the processing of sweetened condensed milk has not been found to alter the milk pH and the mixture can be heated without protein precipitation. The addition of unrefined sugars with high ash content, such as brown sugar, will result in protein precipitation during heating due to the effect of the mineral content of the sugar in causing a decrease in the milk pH.

The art has not recognized the novel flavor features of brown sugar sweetened condensed milk much less the initial process required to obtain such brown sugar sweetened condensed milk without substantial casein precipitation.

SUMMARY OF THE INVENTION

A sweetened condensed milk composition comprising at least 8% milk fat, 28% total milk solids and approximately 44.5% carbohydrate sweetener sugar solids, which comprises at least 75% by weight of brown sugar solids and sucrose, and sufficient food grade alkaline salts to adjust the pH of the uncondensed sweetened milk to within the range of 6.75-6.85, prior to boiling, to avoid casein precipitation.

It is the principal object of this invention to provide a brown sugar sweetened condensed milk for increased brown sugar flavor in confections made therefrom.

It is also an object of the invention to provide a process of preparing a brown sugar sweetened condensed milk without precipitation problems of heat instability.

These and other objects of this invention will become apparent from the following detailed description and preferred embodiment of the invention, which are meant to be merely illustrative of the scope of the invention.

DESCRIPTION OF THE INVENTION

Sweetened condensed milk is defined by Federal Regulations as the food obtained by partial removal of water only from a mixture of milk and safe and suitable nutritive carbohydrate sweeteners. The finished food must contain at least 8.0% by weight milk fat, not less than 28 percent of total milk solids, sufficient sweetener to prevent spoilage, e.g., approximately 44.0-44.5% carbohydrate sweetener sugar solids, e.g. sucrose solids when refined sugar is used, and water. The milk and sugar blend is pasteurized and may be homogenized. The food product is classified as a low acid food, i.e., pH greater than 4.6 and must have a water activity of not more than 0.85, corresponding to a minimum sucrose-in-water concentrate of 61.5%. Monosaccharide sweeteners, such as dextrose, require lesser concentration due to their higher osmotic pressure.

Other nutritive carbohydrate sweeteners, which have been used in sweetened condensed milk, include disaccharides such as maltose and monosaccharides such as dextrose, fructose, and the monosaccharides in corn syrup, hydrolyzed corn syrup and honey.

The addition of refined sucrose to milk at its normal pH of 6.75-6.85 does not alter the milk pH, and the mixture can be boiled without casein precipitation. This has also been true of the other nutritive carbohydrate saccharides listed above. It has been unexpectedly found, however, that the simple substitution of brown sugar solids for No. 1 sucrose solids in milk results in a substantial lowering of the sweetened milk pH to 6.2-6.4 which, in turn, produces heat precipitation of casein when the sweetened milk is heated to temperatures at 82.2° C. (180° F.) or above under conventional sweetened condensed milk processing.

The effect of an increase in acidity or an increase in the amount of polyvalent cations on the heat stability of sucrose or sucrose and dextrose sweetened milk has been recognized in the art, as shown for example in the authoritative reference of Hunziker, *Condensed Milk and Milk Powder,* 1949 Ed., page 276. If the milk pH has been reduced below 6.7, the usual practice has been to add a stabilizing salt such as disodium phosphate to the sweetened milk to prevent heat destabilization. Prior art processes, however, have not used high ash content, unrefined sugars. Stabilizing salts have been sufficient for stabilizing the sweetened milk against minor variation in mineral balance and acidity.

The use of conventional stabilizing salts with brown sugar sweetened milk, although partially successful, has not been found to be satisfactory for preventing casein heat precipitation due to the unexpectedly high reduction in milk pH produced by the addition of brown sugar solids.

Stabilization of the brown sugar sweetened condensed milk has been found to require the addition of a food grade alkali to the brown sugar sweetened milk to offset the extreme lowering of pH by the high ash sweetener and adjust the pH to the normal range of 6.75-6.85 prior to heating to temperatures of about 98.9° C. (210° F.).

A study of the effects of various protein stabilizing salts on the heat stability of milk protein in brown sugar sweetened milk revealed that sodium hexametaphosphate was of only minor benefit and that trisodium phosphate gave slightly better results than di-sodium phosphate, suggesting that the alkali sodium was primarily responsible for stabilizing the casein. The use of tri-sodium phosphate to stabilize sweetened milk was feasible for adjusting the pH of the sweetened milk to approximately 6.85, but it required three times the amount of the preferred sodium hydroxide alkali stabilizer to provide a milk pH of 6.85 which will provide heat stability for a shelf stable brown sugar sweetened condensed milk composition.

In addition to tri-sodium phosphate and the preferred sodium hydroxide stabilizing salts disclosed above, sodium citrate and potassium alkali salts have also been found to have utility as stabilizers in the process of this invention.

In one preferred embodiment of this invention, it has been found that a heat stable sweetened milk having a pH of 6.8 can be obtained through the addition of sufficient sodium hydroxide to a brown sugar syrup to give a pH of approximately 10.0 and then adding the pH adjusted brown sugar syrup to milk to obtain a sweetened milk mixture that can be boiled without protein precipitation, and yet give a sweetened condensed milk having a distinctive brown sugar flavor for use in candies and the like. In this manner, the conventional sucrose sweetener can be totally replaced by soft brown sugar in syrup form.

As an alternative to reliquefication of soft brown sugar to produce a syrup for use in the present invention, the sweetened milk composition can be provided by the use of a commercially available brown sugar concentrate. The brown sugar concentrate is produced in conventional soft brown sugar processing. Unlike soft brown sugar, the concentrate is withdrawn prior to crystallization and centrifugational washing with water and, therefore, contains more ash than the commercial soft brown sugar. This ash is responsible for the distinctive flavor of brown sugar. Thus, the brown sugar concentrate provides increased flavor and avoids the extra expense and processing required to dissolve soft brown sugar solids in water to produce the required syrup sweetener of the invention.

When sweetened condensed milk is prepared with brown sugar concentrate according to this invention, it has been found that an acceptable brown sugar flavor can be obtained with the use of a blend of 3 parts brown sugar concentrate to one part sucrose on the solids basis, with accompanying pH adjustment.

The amount of brown sugar concentrate to refined sucrose used in the brown sugar sweetened condensed milk of the invention can of course be varied dependent upon the degree of brown sugar flavor desired in the final product. The amount of brown sugar ash content, which is responsible for the brown sugar flavor, can also be obviously adjusted for the desired flavor and would cause an intendant change in the amount of alkali required to adjust the milk pH to avoid heat instability, since the ash is responsible for the marked reduction in pH of the brown sugar sweetened milk.

The following examples are provided purely as illustrations of the brown sugar sweetened condensed milk of this invention. The invention is not to be considered as limited to the particular ingredients, amounts or operating conditions given therein, since applicant intends to cover all modifications and equivalents of the process and composition within the scope of the appended claims.

EXAMPLES

| Composition | Percent | Ratio |
|---|---|---|
| Fat | 8.0 | 1 |
| MSNF | 20.0 | 2.5 |
| TMS | 28.0 | 3.5 |
| Sugar | 44.5 | 5.56 |
| Total Solids | 72.5 | 9.06 |

1. 1000 lbs product using soft brown sugar:
   a. Milk standardized to a ratio of 1 Fat: 2.5 MSNF.
      280 lbs. TMS @ .115 lbs. TMS per lb. milk (e.g. Holstein Cow Milk) = 2434.78 lbs. milk.
   b. Soft brown sugar (96.5% T.S.) reliquified to 66% T.S. and pH adjusted to 10.0 with NaOH at 0.0017 lbs. per lb. sugar.
      280 lbs. TMS × ratio of 44.5% sugar per 28.0% TMS, i.e. 1.589 = 445 lbs. sugar solids.
      445 lbs @ 96.5% = 461.14 lbs sugar
      445 lbs @ 66% = 674 lbs syrup (61.12 gal)
      445 lbs sugar × .0017 = 0.76 lbs NaOH
      (dissolve NaOH in water at 1 lb/gal solution)
   c. Blend milk and syrup and deliver to hot well at

EXAMPLES-continued

175° F. OR Alternatively, milk can be delivered to hot well at 175° F. and syrup then added. The pH of milk and syrup should be 6.8.
  d. Steam inject to 195-205° F.
  e. Concentrate to 72.5% T.S.
  f. Cool to 85° F., seed and cool to 70° F.
2. 1000 lbs product using brown sugar concentrate:
  a. Milk standardized to a ratio of 1 Fat; 2.5 MSNF.
    280 lbs. TMS @ .115 lbs. TMS per lb. milk (e.g. Holstein Cow Milk) = 2434.78 lbs. milk.
  b. Brown sugar concentrate (70% T.S.) blended with #1 sucrose syrup (66% T.S.) in ratio of 75 parts brown sugar solids to 25 parts #1 sucrose adjusted to 66% T.S. and pH standardized to 10.0 with NaOH at .0021 lbs per lb sugar.
    280 lbs. TMS × ratio of 44.5% sugar per 28.0% TMS, i.e. 1.580 = 445 lbs. sugar solids.
    445 × .75 = 333.75 lbs brown sugar solids
       × .25 = 111.25 lbs #1 sucrose solids
    445 lbs sugar @ 66% T.S. = 674 lbs (61.12 gal) syrup
    445 lbs sugar × .0021 = 0.93 lbs NaOH (dissolve NaOH in water at 1 lb/gal solution)
  c. Blend milk and syrup and deliver to hot well at 175° F. OR Deliver milk to hot well at 175° F. and add syrup. The pH of the blended milk and syrup should be 6.8.
  d. Steam inject to 195-205° F.
  e. Concentrate to 72.5% T.S.
  f. Cool to 85° F., seed and cool to 70° F.

The process of this invention is of course directed to high sugar solid content products, i.e., sweetened condensed milk which exhibits problems of casein heat precipitation at milk pH below 6.7. The critical feature of this invention, namely, the addition of sufficient alkali to give a sweetened milk of pH 6.75-6.85 which will remain heat stable, would not be required in low sugar solid containing milk product when reduced pH and casein heat precipitation are not problems. Similarly, casein precipitate will obviously not be a problem if heating, i.e., pasteurization is conducted at temperatures below the critical temperature range of approximately 82.2°-85° C. (180°-185° F.).

The enhanced brown sugar flavor of the sweetened condensed milk product of this invention has been found to provide enhanced flavor for candies, cakes, pies and other confections which traditionally utilize brown sugar and sweetened condensed milk.

Applicant having disclosed the invention, obvious modifications will become apparent to those skilled in the related food arts. The invention is therefore to be limited only by the scope of the appended claims.

I claim:

1. A sweetened condensed milk composition comprising at least 8.0% milk fat, 28% total milk solids, water, approximately 44.5% carbohydrate sweetener solids comprising a mixture of high ash, unrefined, brown sugar solids and sucrose, at least 75% of which is said brown sugar solids, and sufficient food grade alkaline stabilizer to adjust the pH of the sweetened milk to 6.75-6.85, prior to heat treatment, to avoid casein precipitation when the sweetened milk is heated to about 185° F. or above to form sweetened condensed milk.

2. A process for preparing a brown sugar sweetened condensed milk containing a substantial amount of an unrefined, high ash content, brown sugar sweetener comprising the steps of sweetening milk with a high ash content, unrefined brown sugar concentrate and then adding to the sweetened milk a protein stabilizing alkaline salt in an amount sufficient to adjust the pH of the sweetened milk to 6.75-6.85, prior to heating the sweetened milk at a temperature of about 185° F. or above, to avoid casein precipitation upon heating the sweetened milk, and then heating the pH adjusted sweetened milk to a temperature of 195° F. to boiling to produce a shelf stable sweetened condensed milk of legal formulation.

3. The process of claim 2 wherein the protein stabilizing alkaline salt is selected from the group consisting of sodium citrate, trisodium phosphate, and NaOH.

4. The process of claim 2 wherein a potassium salt is used as the protein stabilizing alkaline salt.

5. A process for preparing a brown sugar sweetened condensed milk containing a substantial amount of an unrefined, high ash content brown sugar sweetener comprising the steps of adding sodium hydroxide to a high ash content, unrefined brown sugar syrup in an amount sufficient to give a syrup having a pH of approximately 10 and then adding the syrup to milk to give a sweetened milk with a pH of 6.8, which can be heated at a temperature of about 185° F. or above without casein precipitation, and then heating the pH adjusted sweetened milk to a temperature of 200° F. to boiling to produce a shelf stable sweetened condensed milk of legal formulation.

* * * * *